Feb. 10, 1970     J. O. HAZEN     3,494,084
VERTICALLY ADJUSTABLE UNDERFLOOR TRENCH
Filed Dec. 19, 1966
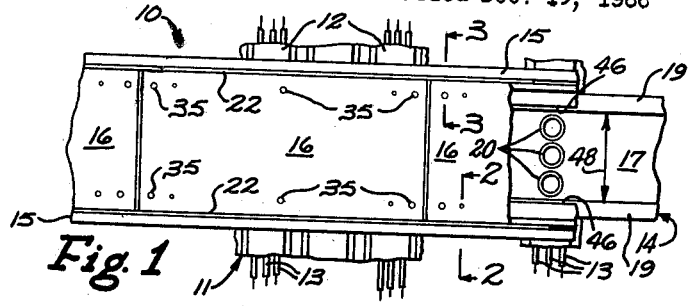
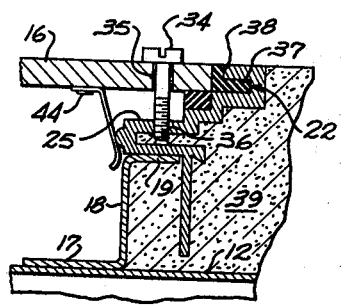
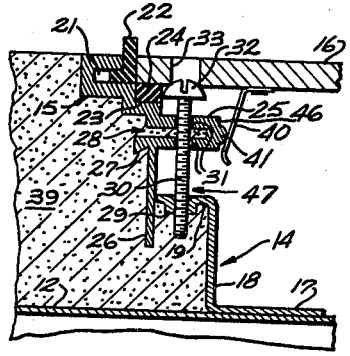
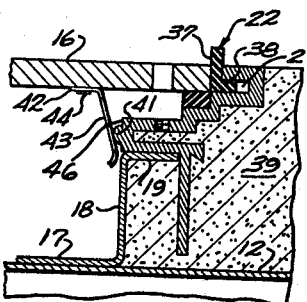
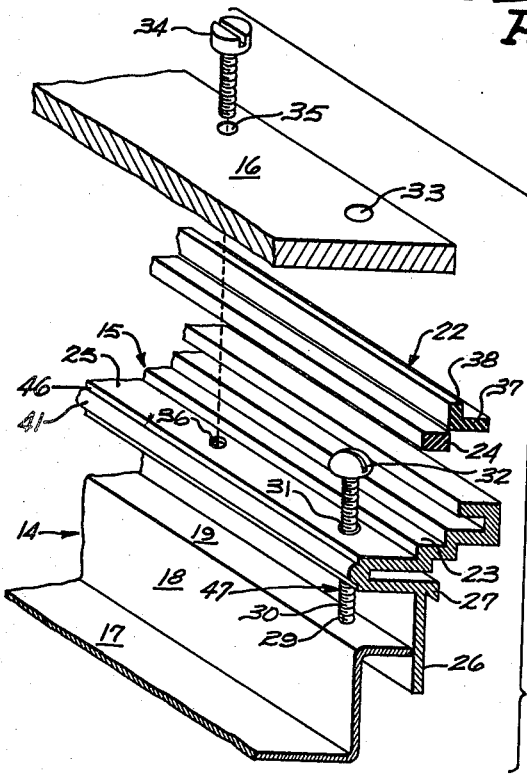
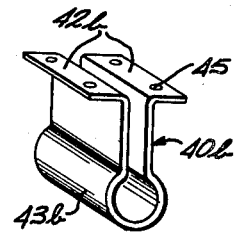
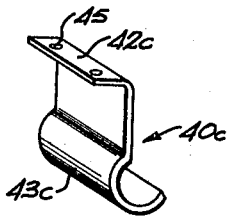
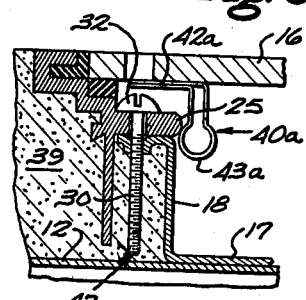
INVENTOR.
JOHN O. HAZEN
BY Harry B. Koch
ATTORNEY.

United States Patent Office 3,494,084
Patented Feb. 10, 1970

3,494,084
VERTICALLY ADJUSTABLE UNDERFLOOR TRENCH
John O. Hazen, Monaca, Pa., assignor to H. H. Robertson Company, Pittsburgh, Pa., a corporation of Pennsylvania
Filed Dec. 19, 1966, Ser. No. 602,791
Int. Cl. E04f 19/04
U.S. Cl. 52—221          10 Claims

ABSTRACT OF THE DISCLOSURE

A vertically adjustable underfloor electrical trench, free of exposed fasteners for securing the cover plate. Resilient fasteners depend from the cover plates and engage subjacent trench elements. Positive fasteners such as screws are provided to fasten the cover plates during fabrication, shipment, storage and installation of the trench. After the trench is rigidly embedded in concrete, the positive fasteners are removed. Improved methods of assembling and installing the trench are described.

BACKGROUND

Underfloor electrical trenches first appeared as commercial products in about 1961. Typical trench products are described in U.S. Patents 3,074,208, 3,084,480, 3,101,097, 3,166,633, 3,204,378, 3,237,356, 3,262,238. All of these products include a base pan, vertically adjustable side rails, and a cover plate above the base pan spanning the distance between the side rails. All prior electrical trenches have included hold-down screws extending through the cover plate into the subjacent elements and having heads exposed above the level of the cover plate where the heads are visible and operable at the floor level. The screw heads extend through floor surfacing materials such as asphalt tiles, carpeting, sprayed-on plastic floor covering, marble, terrazzo. The screw heads are disposed along the edges of the cover plate with the result that the relatively narrow band of floor covering materials between the screw heads and the edges of the cover plates tends to fracture and thereby disfigure the floor surface appearance. The exposed screw heads must be turned to remove the cover plates from the underfloor electrical trench from time-to-time throughout the life of the building when changes in the electrical availability are necessitated. To date there are no commercial underfloor electrical trenches which are free of exposed fasteners.

Two earlier attempts to produce a fastener-free underfloor electrical duct are described in co-pending U.S. patent applications Ser. No. 530,464 filed Feb. 28, 1966, now Patent No. 3,368,311 and Ser No. 540,686 filed Apr. 6, 1966, both assigned to the assignee of the present invention. Both of these earlier attempts to produce a fastener-free underfloor electrical trench proceeded from the quite logical premise that a fastener-free trench should be free of fasteners. As a result, both of these earlier fastener-free trenches have no fasteners whatsoever for the cover plates.

DESCRIPTION OF THE INVENTION

I have discovered that a fastener-free underfloor electrical trench functionally must be free of fasteners only after it has been installed in its normal environment and embedded in a rigid, hardened concrete slab. Whether or not the trench assembly has exposed fasteners prior to embedment in the concrete is immaterial from a functional standpoint. Based upon this realization, I have provided a fastener-free underfloor electrical trench which has no exposed fasteners when in normal use but which is retained during fabrication, shipping, storage and installation by means of exposed fasteners. The exposed fasteners are removed only after the assembly is installed in a building and embedded in hardened concrete. The cover plate in the present trench is an essential element of a unitary sub-assembly which includes the side rails during fabrication, shipment, storage and installation of the trench. After installation, the side rails enter into a sub-assembly with the hardened concrete slab which surrounds the trench. Thereafter the cover plate can be separated from engagement with the side rails. I provide resilient fasteners which depend from the cover plate and resiliently engage subjacent trench components to retain the cover plate in close contact with the side rails.

OBJECTS

The principal object of this invention is to provide an underfloor trench free of exposed fasteners.

Another object of this invention is to provide an improved method for assembling a vertically adjustable electrical cable trench.

A further object of this invention is to provide an improved method for installing an underfloor electrical cable trench.

The present invention, its objects and advantages would become apparent from the following detailed description by reference to the accompanying drawings in which:

FIGURE 1 is a plan view of the present electrical trench when installed above metal cellular flooring in a typical building floor construction;

FIGURES 2 and 8 are fragmentary cross-section views taken along the lines 2—2 of FIGURE 1 showing the present electrical trench in its elevated condition (FIGURE 2) and in its lowermost position (FIGURE 8);

FIGURES 3 and 4 are fragmentary cross-section views taken along the line 3—3 of FIGURE 1 showing the present electrical trench prior (FIGURE 4) to removal of the fasteners and after activation of the trench (FIGURE 3);

FIGURE 5 is an exploded fragmentary perspective view of the present electrical trench showing its assembly prior to shipment, storage and installation;

FIGURES 6, 7, 9 are perspective views of alternative embodiments of a suitable resilient fastening element.

The present electrical trench assembly 10 is illustrated in FIGURE 1 as mounted above metal cellular flooring 11 in a typical modern building. The metal cellular flooring 11 has a plurality of parallel cells 12 constituting electrical raceways for electrical conductors 13 which are distributed throughout the resulting building. A typical underfloor electrical trench 10 includes a base pan 14, side rails 15 and cover plates 16. The base pan 14 includes an essentially flat base 17, vertical sidewalls 18 and outwardly extending horizontal flanges 19. Grommeted openings 20 extend through the base 17 into a subjacent, transverse raceway 12 to provide ingress for electrical conductors 13 from the raceway 12 into the electrical trench 10. Where the resulting building has a reinforced concrete construction instead of a metal cellular flooring construction, the base pan 14 may be resting upon and secured to cellular metal raceways in lieu of metal cellular flooring raceways 12.

The side rails 15 are generally similar to those illustrated and described in U.S. Patent 3,262,238. The side rail 15 includes a channel 21 for receiving a reversible tile stop 22; a ledge 23 for receiving a strip gasket 24; a rail 25; a depending skirt 26; and preferably one or more concrete anchor appendages 27. The side rails 15 present opposed inner surfaces 46. While the rail 25 may be solid (see FIGURE 8), it is preferred that the rail 25 include an outwardly opening channel 28. The side rails 15 preferably are formed from aluminum alloy by extrusion processes to the desired profile.

The trench assembly 10 includes adjustment means 47 for vertically spacing the side rails 15 with respect to the base pan 14. For example, the outwardly extending horizontal flanges 19 of the base pan 14 are provided with spaced threaded apertures 29 for threadedly receiving elevating screws 30 which extend through clearance openings 31 in the rail 25 and which have an expanded diameter head 32. When the trench assembly is fabricated, the cover plate 16 includes a number of spaced clearance access openings 33 which are smaller in diameter than the head 22 of the elevating screw 30. Accordingly a screw-turning implement, such as a screw driver tip, can be inserted through the access openings 33 to operate, i.e., to turn, the elevating screws 30 and thereby adjust the height of the screw head 30 above the flange 19 of the base pan 14.

In the lowermost trench position, FIGURE 8, the screw head 32 is below and out of contact with the cover plate 16. In higher trench positions, FIGURE 2, the cover plate 16 rests upon the screw head 32. In order to maintain the cover plate 16 in association with the side rails 15, a number of hold-down screws 34 are provided which extend through clearance openings 35 in the cover plate 16 and which are threadedly engaged in threaded openings 36 in the rail 25. Preferably the hold-down screws 34 are self-tapping screws which cut their own threads into the drilled or punched openings 36.

The side rails 15 are maintained in fixed, spaced-apart relationship. It will be appreciated that the fixed spaced-apart relationship is defined by a preselected distance between any two corresponding points on the side rails 15, for example, the distance 48 (FIGURE 1) between the opposed inner surfaces 46 and the side rails 15.

During fabrication, shipment, storage and installation of the present trench, the side rails 15 and the cover plate 16 are maintained as a unitary subassembly by positive fasteners which rigidly connect them, such as the screws 34. A typical commercial cover plate, 12 to 36 inches wide and 18 to 48 inches long, will have about three hold-down screws in each side edge of the cover plate as can be seen in FIGURE 1.

The reversible tile stop element 22 has one long leg 37 and one short leg 38. When the long leg 37 is disposed in the channel 21 (see FIGURE 4), the edge of the short leg 37 is flush with the top of the side rail 15 and also flush with the cover plate 16. After the trench assembly is installed in a concrete slab 39 and the concrete has hardened, the hold-down screws 34 are removed and discarded, the cover plates 16 are removed and the reversible tile stops 22 are reversed. The reversed tile stop is shown in FIGURES 2 and 3 wherein the long leg 37 extends above the screed line defined by the top of the cover plate 16 and the top of the side rail 15. The cover plate 16 thereafter is retained in covering position by the resilient fasteners which constitute the subject of the present invention.

The resilient fasteners preferably comprise a curved band 40 of metal which is resiliently engageable with an inwardly disposed element of the side rail 15 such as an inwardly presented bead 41, which is extruded directly as an integral element of the side rail 15. The band 40 may take the form shown in FIGURES 2, 3, 4 and include a mounting flange 42 and an outwardly convex curved band 43 which is adapted to slide past the inwardly presented bead 41 of the side rail 15 and present outward stress against the bead 41. Preferably the clip 40 is welded to the underside of the cover plate 16. The mounting flange 42 may have one or more punched openings 45 through which a plug 44 of welding metal can be joined with the under surface of the cover plate 16. The mounting flange 42 may be spot welded directly to the cover plate 16. The present electrical trench requires prior to embedment, positive fastening means between the cover plate 16 and the side rails 15 to create a unitary subassembly. In the absence of the screws 34, the side rails 15 of a non-embedded trench will be urged outwardly by the resilient metal bands 40. By joining the cover plate 16 and the side rails 15 into a unitary subassembly prior to installation of the trench, the resilient metal bands 40 can be maintained throughout the life of the trench under spring compression.

As shown in FIGURE 6, the resilient band 40c may have a mounting flange 42c which extends away from the convex outer surface 43c. As shown in FIGURE 7, the band 40b may have two opposed mounting flanges 42b and two convex surfaces 43b. As shown in FIGURE 9, the resilient band 40a may have two overlapping flanges 42a and two convex surfaces 43a. The resilient bands 40a may be mounted as shown in FIGURE 8 with the mounting flanges 42a extended outwardly, above the rail 25.

The improvement provided by the present invention may be further explained as follows. The present invention provides first and second distinct fastening means, i.e., positive fasteners 34 and resilient fasteners 40, for securing the cover plate 16 to the side rails 15 in two different circumstances. The first circumstance is when the side rails 15 are joined to the base pan 14 solely by the adjustment means 47 (elevating screws 30). The second circumstance is when the side rails 15 are independently anchored, for example by the concrete 39, with respect to the base pan 14 and to each other independently of the adjustment means 47.

The second distinct fastening means comprises the sole fastening means for the cover plate 16 in the second circumstance and comprises the resilient fasteners 40 which are secured to the cover plate 16 and positioned between and engageable with the opposed inner surfaces 46. Thus positioned, the resilient fasteners 40 resiliently retain the cover plate 16 engaged with the independently anchored side rails 15.

The present invention also provides an improvement in the method of assembling the vertically adjustable electrical cable trench 10. In the improved method, the resilient fasteners 40 are secured to the underside of the cover plate 16 inboard of the longitudinal edges thereof. The cover plate 16 is applied to the side rails 15 with the resilient fasteners 40 resiliently engaged with the opposed inner surfaces 46. The resilient fasteners 40 thus exert a thrust against the side rails 15 tending to displace the side rails 15 from the fixed spaced-apart relationship 48. The cover plate 16 is secured to the side rails 15 by the positive fasteners 34 to join, as a unitary sub-assembly, the cover plate 16 and the side rails 15 in the fixed, spaced-apart relationship and to resist the aforesaid thrust.

The present invention also provides improvements in the method of installing the underfloor electrical trench 10. In the improved method, the positive fasteners 34 are applied to join the cover plate 16 and the side rails 15 as a unitary sub-assembly prior to embedment of the trench 10 in the concrete slab 39. While the cover plate 16 is secured to the side rails 15 by the positive fasteners 34, the trench is surrounded by concrete to form the concrete slab 39 having the cover plate 16 and the positive fasteners 34 exposed. The positive fasteners 34 are removed after the side rails 15 are immobilized in a subassembly with the concrete slab 39. Resilient fasteners are engaged between the undersurface of the cover plate 16 and the side rails 15 whereby the cover plate 16 rests upon the side rails 15 and is retained above the base pan 14 solely by the resilient fasteners 40.

the first circumstance and comprises the positive fasteners 34 which secure, as a unitary sub-assembly, the cover plate 16 and the side rails 15 in the fixed, spaced-apart relationship.

I claim:

1. In an underfloor electrical cable trench adapted for embedment in concrete, including
   a base pan, a pair of side rails maintained in fixed, spaced-apart relationship and presenting opposed inner surfaces, a cover plate positioned above the said base pan and spanning the distance between the said side rails, and adjustment means for vertically spacing the said side rails with respect to the said base pan, the improvement comprising:

first and second distinct fastening means for securing the said cover plate to the said side rails in two different circumstances, the first circumstance being when the said side rails are joined to the said base pan solely by the said adjustment means; and the second circumstance being when the said side rails are independently anchored with respect to the said base pan and to each other independently of the said adjustment means;

the said first distinct fastening means being operable solely in the said first circumstance and comprising positive fasteners which secure as a unitary sub-assembly the said cover plate and the said side rails in the said fixed, spaced-apart relationship; and the said second distinct fastening means comprising the sole fastening means for the said cover plate in the said second circumstance and comprising resilient fasteners secured to the said cover plate and positioned between and engageable with the said opposed inner surfaces of the said side rails for resiliently retaining the said cover plate engaged with the independently anchored side rails.

2. The trench improvement of claim 1 wherein the said positive fasteners comprise screws extending downwardly through the said cover plate and threadedly engaged in the said side rails.

3. The trench improvement of claim 1 including inward projections on the said side rails engageable by the said resilient fasteners.

4. The trench improvement of claim 3 wherein the said resilient fasteners comprise a resilient band secured to the undersurface of the said cover plate and being outwardly concave and engageable with the said inward projections of the said side rails.

5. The trench improvement of claim 4 wherein the said resilient band is welded to the undersurface of the said cover plate through a mounting flange.

6. The improvement of claim 1 wherein
the said resilient fasteners exert a thrust against the said side rails tending to displace the said side rails from the said fixed, spaced-apart relationship, and wherein
the said positive fasteners resist the said thrust.

7. The trench improvement of claim 1 wherein the said resilient fasteners are secured to the undersurface of the said cover plate and are not visually discernible when engaged with the said side rails.

8. The trench improvement of claim 1 wherein the said resilient fasteners are positioned inboard of the longitudinal edges of said cover plate.

9. In the method of installing an underfloor electrical cable trench in a concrete slab, said cable trench including a base pan, vertically adjustable side rails and a cover plate positioned above the base pan and spanning the distance between the side rails, the improvement comprising:

applying positive fasteners to join said cover plate and said side rails as a unitary sub-assembly prior to embedment of said trench in said concrete slab;

while said cover plate is secured to said side rails by said positive fasteners, surrounding said trench with concrete to form the said concrete slab having the said cover plate and the said fasteners exposed;

removing said positive fasteners after said side rails are immobilized in a sub-assembly with the said concrete slab; and engaging resilient fasteners between the undersurface of said cover plate and the said side rails whereby the said cover plate rests upon the said side rails and is retained above said base pan solely by the said resilient fasteners.

10. In the method of assembling a vertically adjustable electrical cable trench of the type having a base pan, a pair of side rails maintained in fixed, spaced-part relationship and presenting opposed inner surfaces, a cover plate positioned above the said base pan and spanning the distance between the said side rails, and adjustment means for vertically spacing the said side rails with respect to the said base pan, the improvement comprising:

securing resilient fasteners to the underside of said cover plate and inboard of the longitudinal edges thereof;

applying the said cover plate to the said side rails with the said resilient fasteners resiliently engaged with the said opposed inner surfaces and exerting a thrust thereon tending to displace the said side rails from the said fixed spaced-apart relationship; securing the said cover plate to the said side rails by positive fasteners to join as a unitary sub-assembly the said cover plate and the said side rails. in said fixed, spaced-apart relationship and to resist the said thrust.

References Cited

UNITED STATES PATENTS

| 1,987,405 | 1/1935 | Lundy | 174—101 X |
|---|---|---|---|
| 2,271,924 | 2/1942 | Nielsen | 52—512 |
| 2,503,876 | 4/1950 | Krauss | 174—101 X |
| 3,084,247 | 4/1963 | Bobrick | 174—101 X |
| 3,101,097 | 8/1963 | Murray | 220—3.4 X |
| 3,187,922 | 6/1965 | Hoskins et al. | 220—3.4 |
| 3,204,378 | 9/7965 | Stuessel et al. | 52—221 |
| 3,262,238 | 7/1966 | Fork | 52—221 |
| 3,286,412 | 11/1966 | Grieg et al. | 52—479 X |
| 3,329,763 | 7/1967 | D'Esopo | 174—101 X |

FOREIGN PATENTS

| 515,703 | 12/1939 | Great Britain. |
|---|---|---|
| 919,494 | 2/1963 | Great Britain. |
| 854,137 | 1/1940 | France. |
| 1,149,500 | 7/1957 | France. |
| 1,337,128 | 7/1963 | France. |
| 1,357,069 | 2/1964 | France. |

ALFRED C. PERHAM, Primary Examiner

U.S. Cl. X.R.

138—192; 174—101; 52—122

UNITED STATES PATENT OFFICE
CERTIFICATE OF CORRECTION

Patent No. 3,494,084      Dated February 10, 1970

Inventor(s) John O. Hazen

It is certified that error appears in the above-identified patent and that said Letters Patent are hereby corrected as shown below:

In the drawing, the title should read --Vertically Adjustable Underfloor Trench and Method of Assembling and Installing the Same--.

Column 1, lines 2 and 3, the title should read --Vertically Adjustable Underfloor Trench and Method of Assembling and Installing the Same--.

Column 4, after line 29, insert the following paragraph ---The first distinct fastening means is operable solely in the first circumstance and comprises the positive fasteners 34 which secure, as a unitary sub-assembly, the cover plate 16 and the side rails 15 in the fixed, spaced-apart relationship.--.

Column 4, line 53, after "electrical" insert --cable--.

Column 4, cancel lines 69 to 71 inclusive.

SIGNED AND
SEALED
JUL 21 1970

(SEAL)
Attest:

Edward M. Fletcher, Jr.
Attesting Officer

WILLIAM E. SCHUYLER, JR.
Commissioner of Patents